Dec. 25, 1962 G. H. TREVOR 3,070,070
PACKING GLANDS
Filed Jan. 25, 1960
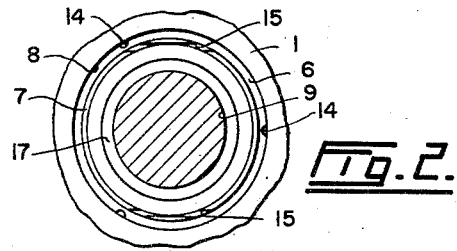
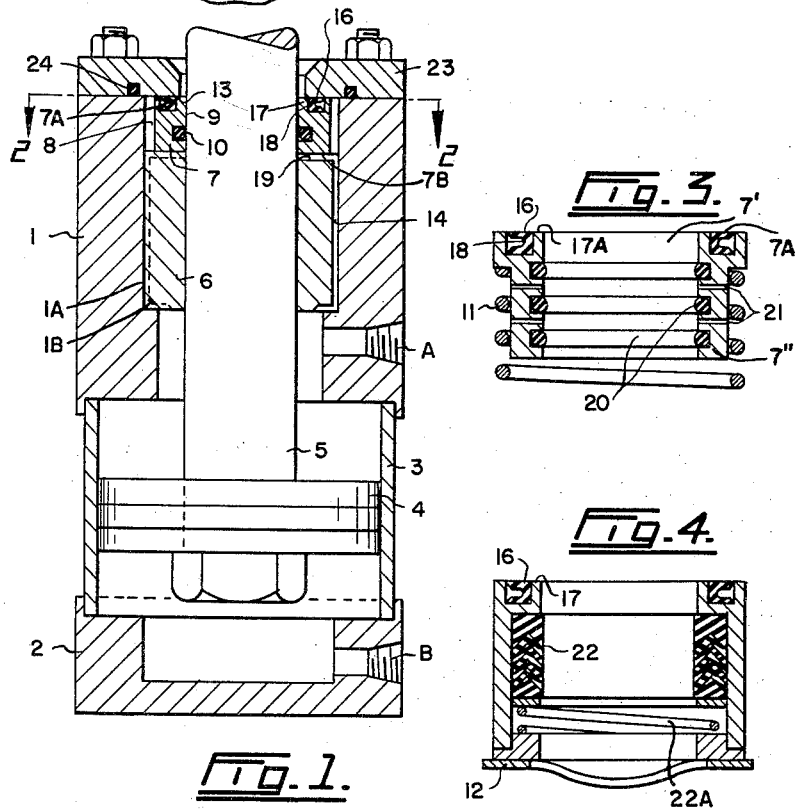
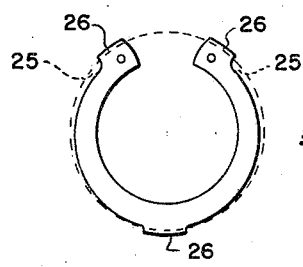
INVENTOR United States Patent Office 3,070,070
Patented Dec. 25, 1962

3,070,070
PACKING GLANDS
Godfrey H. Trevor, Mersey Road, Box 445, Alberni, British Columbia, Canada
Filed Jan. 25, 1960, Ser. No. 4,318
5 Claims. (Cl. 121—38)

This invention relates to fluid seals on reciprocating shafts, specifically it relates to the application of glands on piston rods and rams of reciprocating fluid motors.

The application of these packing glands or stuffing boxes is a well-known art, which generally comprises a guide bushing or annular liner to act as a bearing for the reciprocating piston rod member, having, usually at the outer end, an annularly disposed packing composed of a resilient material, which packing may be a type requiring periodic re-packing or adjusting, or be of a type which is self-adjusting.

The application of these reciprocating fluid motors is varied, they are adaptable to perform functions of pushing, pulling, closing, opening, lifting, and so forth, to fulfill which purposes such motors are found in many forms. As the size and/or weight, and consequently the power, of these motors increases, increasing side pressure develops between the guide, or bearing bushing, through which the reciprocating piston rod or ram passes. This increased stress and weight is not too great a disadvantage in manually adjustable packing glands, as these are able to accommodate considerable eccentricity of the reciprocating member, this eccentricity being caused by mutual radial wear of guide and bearing bushing.

However, this stress and weight, and consequent increased wear of guide and/or bearing bushing, are of consequence in packing glands using an automatic type of packing, that is, a resilient packing material requiring no adjustment, and which (in practice) is not capable of adjustment during its service lift. Such packings usually require close sliding tolerances relative to the reciprocating member, which tolerances are difficult to maintain due to the aforementioned transverse stresses, and consequent wear. When a particular amount of wear has developed, which amount depends upon fluid pressure and upon the particular gland structure, these automatic packings are, either extruded through the excess clearance resulting from wear, or are unable to assume the increase in cross-section adjacent to the area of wear, or both, and failure results from one or from combination of both of these causes. When this state is reached the renewing of the seal alone is of little use without replacing the bearing bushing, particularly with seals requiring a cross-sectional squeeze, such as O-rings or quad rings, as these will be pinched and extruded in, and through, the excess clearance caused by wear.

The object of this invention is to overcome the aforementioned disadvantages by providing:

An automatic packing mounting which does not require adjustment during the service life of the packing.

Another object is to provide a packing gland capable of free lateral movement in any direction automatically, thereby substantially reducing thrust on this structure by the sealed reciprocating member.

Another object is to provide a packing mounting structure completely detached from any piston or ram bearing bushing, thereby preventing undue wear of gland structure and packing disposed therein, with the resultant loss of the ideal tolerances required for a given resilient packing material at a given pressure.

Another object is to provide a packing gland structure independent from any piston rod or ram bearing bushing, allowing this gland to be made from a material more wear-resistant than a bearing bushing, or having other favorable properties.

Another object is to provide an inexpensive packing gland structure readily renewable in the field, without special tools or remanufacturing.

Another object is to provide a pressure balanced packing gland, which is subject to a minimum of axial thrust, thereby allowing this component to align itself freely to piston rod or ram, this is accomplished by providing an annular fluid filled clearance surrounding the gland.

Another object is to provide a packing gland in which an annularly disposed resilient packing subjected to a cross-sectional squeeze, or a plurality of such packing rings, suspend this gland concentrically over a piston rod, thereby prolonging the service life of the gland.

These and other objects and advantages of the invention will become apparent as the disclosure proceeds.

In practice it is frequently necessary to extend a piston rod through both cylinder heads, this extension is normally used to accomplish a balance of pressure on both sides of piston, and also to obtain an uniformity of speed and thrust in both directions with pressure fluid from a common source. When and where a piston rod is required to extend in both directions the gland and bearing structure to be described is duplicated.

In the drawings:

FIGURE 1 is an elevation, in part sectioned, showing a reciprocating cylinder device equipped with a packing gland according to the invention.

FIGURE 2 is a section on line 2—2 of FIGURE 1.

FIGURE 3 is an alternative form of packing gland having several internal packing rings and helical spring closure.

FIGURE 4 is a further alternative gland construction showing leaf spring closure.

FIGURE 5 is a plan view of a retaining ring.

In FIGURE 1, cylinder heads 1 and 2 at each end of the cylinder 3 are provided with ports A and B for the admission of fluid under pressure alternately to either side of a piston 4. Conventional valve means to control the fluid are not shown.

The head 1 is of hollow cylindrical form having an inner wall 1A to define with the piston rod 5 a space to receive the bushing 6, which space is herein referred to as a cylindrical chamber, said chamber having the annular lip 1B forming a lower annular surface of the chamber.

Piston 4 has the piston rod 5, said rod passing through the bearing bushing 6, which bushing preferably is a press in head 1 retained from further axial movement by the lip 1B. Within said chamber adjacent the end of the bushing 6 remote from the piston, is the gland 7, substantially a thick walled hollow cylinder having outer and inner annular surfaces 7A, 7B. The outside diameter thereof is such as to provide a radial clearance 8 from the adjacent inner wall of the chamber 1A. The bore 9 forming the inside diameter of the gland is suitably counterbored to receive the resilient packing material 10, such as for example an O-ring packing, to provide a seal between the piston rod and the gland.

The diametric clearance between the rod 5 and the gland is preferably close to the maximum recommended for the particular packing, so that angularity of the rod may be accommodated even in a new installation.

The radial clearance 8 aforesaid is not less than the anticipated wear of the bearing bushing 9, so that the gland may accommodate to displacements of the piston rod 5 consequent upon such wear. In the FIGURE 1 embodiment, the axial dimension is such as to restrain it against axial motion relative to the cylinder head.

Alternatively, as shown in the FIGURE 3 embodiment, restraint may be effected by helical spring means 11. In the construction shown in FIGURE 4, the restraint is by means of the leaf spring 12. In each of these alternatives, the spring urges the upper surface of the gland against the machined surface 13 (see FIGURE 1) of the cylinder head 1 end closure member 23. The FIGURE 3 and FIGURE 4 embodiments will be referred to later.

Grooves 14, FIGURE 1, preferably not less than two in number, are formed in the outer surface of the bushing 6 and continue in the upper surface thereof so that the hydraulic fluid under pressure may pass beyond said bushing.

The upper surface 7A of the gland is provided with a packing groove, as best seen in FIGURE 3 in which the gland and groove construction is similar to the FIGURE 1 embodiment. Referring to FIGURE 3, the groove 18 is formed to receive the packing 16 preferably of the type known as a pressure energized seal characterized by the U-shaped section as there shown. It is important that said packing 16 be close to the piston rod, hence the lip 17 is as narrow as mechanical considerations of strength permit, having regard to the maximum working pressure and other relevant factors. The depth of the groove is according to the manufacturer's recommendation for the particular packing and use—somewhat less than the axial dimension of the packing.

The action of the FIGURE 1 embodiment is as follows. Fluid under pressure will pass beyond the bushing 6 through the passages 14 to the space 8. It is seen that the gland 7 may thus move laterally the extent of the clearance, cushioned by the fluid in the clearance. Fluid may also pass between the upper surface 7A of the gland and the surface 13 to the groove 18 so expanding the U-packing 16 in sealing engagement with 13 aforesaid.

This action, which may be likened to a seepage between 7A and 13, is not relied upon where higher hydraulic pressures are to be encountered. In such installations openings 15, see FIGURE 2, are formed in the upper surface of the gland to permit free flow of the fluid from the clearance 8 to said U-packing, so to expand the same to a firm seal against 13.

A further advantage of the U-seal in the FIGURE 1 embodiment is that, even when the fluid is not under pressure, the seal is not broken. This is because the axial dimension of the gland is such that, without internal pressure to expand the U-packing, contact is still maintained. Thus dust, grit, and like abrasive and damaging materials are excluded under the circumstances above.

The foregoing embodiments can readily be adapted to the ram or piston of a press or jack, or to a lifting column unsupported at the outer end. These all function with varying amounts of transverse pressure against the bearing bushing, due to alignment to work, weight distribution, and like factors. In such applications the bearing bushing 6 will receive the transverse stresses and consequent wear, leaving pressure balanced gland 7 in normal alignment, with a consequent longer service life for this gland and packing disposed therein.

In FIGURE 3, an alternative form of gland is shown. This comprises the upper portion 7' similar to the gland 7 as before described, and the integral lower portion 7" of smaller outside diameter to accommodate the helical spring 11, the unstrained length of which is greater than the axial dimension of 7" aforesaid. Internally of the bore of this gland are several grooves to receive the several O-packing rings 20, similar to the rings 10 of the FIGURE 1 embodiment. Intermediate the packing rings 20 are vents 21 to prevent pressure lock.

In this embodiment, tolerances are not critical since the helical spring 11, it is seen, provides force closure of the gland against the inner surface 13 in the absence of hydraulic pressure. The sealing action is otherwise similar—passages as 15, FIGURE 2 (not shown in FIGURE 3), may be provided as before, in the lip 17A.

In a device subject to severe shock and/or vibration, such as for example concrete block machines or fluid actuated riveters, forging machines, and the like, the FIGURE 3 embodiment is preferred. Close tolerances are not required, and the additional packing rings have a cushioning action. The construction is seen to eliminate the necessity for the fluid passage 19, FIGURE 1.

A further embodiment is illustrated in FIGURE 4, wherein it is seen that the helical spring 11 is eliminated in favor of the leaf spring 12, known in the trade as a wave spring, to serve the same purpose. In FIGURE 4, a conventional packing ring 22 of the type requiring spring means 22A to effect sealing, and to compensate for packing wear, is shown. Alternatively, conventional packing, not requiring spring 22A, may be used. The sealing action of the U-ring 16 is as before described.

The gland 7 may be placed at the lower end of the bearing bushing 6, FIGURE 1. In such case a retaining ring such as illustrated in FIGURE 5, having fluid ports 25 and lugs 26, may obviously be used to retain the gland.

Specific embodiments have been described above. It is to be understood that the invention is not intended thereby to be restricted, but is intended to cover such modifications and alternative constructions as fall within the spirit and scope of the invention as expressed in the description, illustrated in the drawings, and as set forth in the appended claims.

What I claim as my invention is:
1. In a fluid actuated reciprocating piston and cylinder assembly having, heads at the extremities of said cylinder, a rod attached to the piston extending through a head,
  (a) disposed within a cylinder head a bushing slidable on the rod, said bushing having a passage to permit fluid to pass therethrough,
  (b) adjacent the bushing on the side thereof remote from the piston, a cylindrical chamber having an upper surface formed by a head closure member and a lower annular surface,
  (c) a gland within the chamber, which gland is substantially a hollow cylinder having an upper annular surface and a lower annular surface, the piston rod slidable on the inside diameter of the gland,
    (i) the outside diameter of the gland materially less than the diameter of the chamber, to define therewith a clearance,
    (ii) in the upper annular surface a groove adapted to receive a pressure energized packing ring in sealing engagement with the upper surface of said chamber.
2. A device as claim 1, and
  (c) (iii) an outer lip in the upper annular surface defined by; the outer periphery of the gland, the part of the upper annular surface between said outer periphery and the groove, and the groove; a passage formed in said outer lip to permit fluid to pass from the clearance to the pressure energized packing.
3. A device as claim 2,
  (c) (iv) a counterbore in the gland and resilient packing in the counterbore.
4. A device as claim 1,
  (c) (iii) a counterbore in the gland and resilient packing in the counterbore.
5. A device as claim 1, and
  (d) a compression spring between the lower annular surface of the gland and the lower annular surface of the cylindrical chamber.

References Cited in the file of this patent
UNITED STATES PATENTS
2,836,443   Farmer _____ May 27, 1958